US012752866B2

(12) United States Patent
Beierl

(10) Patent No.: US 12,752,866 B2
(45) Date of Patent: Oct. 6, 2026

(54) PROPULSION DEVICE, WIND DEFLECTOR AND MOTOR VEHICLE

(71) Applicant: Dr. Ing. h.c. F. Porsche Aktiengesellschaft, Stuttgart (DE)

(72) Inventor: Dominik Beierl, Kontal-Münchingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 277 days.

(21) Appl. No.: 18/752,998

(22) Filed: Jun. 25, 2024

(65) Prior Publication Data

US 2025/0010925 A1 Jan. 9, 2025

(30) Foreign Application Priority Data

Jul. 7, 2023 (DE) ......................... 102023117947.0

(51) Int. Cl.
*B62D 35/00* (2006.01)
*B62D 37/02* (2006.01)

(52) U.S. Cl.
CPC ........... *B62D 35/00* (2013.01); *B62D 35/008* (2013.01); *B62D 37/02* (2013.01); *Y02T 10/82* (2013.01)

(58) Field of Classification Search
CPC ...... B62D 35/00; B62D 37/02; B62D 35/008; Y02T 10/82
USPC ........................................... 296/180.1, 180.5
See application file for complete search history.

(56) References Cited

U.S. PATENT DOCUMENTS 5,673,515 A * 10/1997 Weber .................... E05F 11/385 49/140
8,353,557 B2 * 1/2013 Rooijakkers ............... B60J 7/22 296/217
9,233,599 B2 * 1/2016 Kriese .................... B60J 5/0416
(Continued)

FOREIGN PATENT DOCUMENTS

DE 4427989 A1 2/1996
DE 102006017522 A1 10/2007
DE 102014209605 A1 11/2015
(Continued)

OTHER PUBLICATIONS

German Search Report with translation mailed on Mar. 8, 2024, by the German Patent Office in German App. No. 10 2023 117 947.0. (3 pages).

*Primary Examiner* — Roger L Pang
(74) *Attorney, Agent, or Firm* — Buchanan Ingersoll & Rooney PC

(57) ABSTRACT

A propulsion device for retracting and extending a wind deflector of a motor vehicle. A first guide rail extends in the longitudinal direction (X) and has a first carriage guide, which extends in the longitudinal direction (X) along the first guide rail and varies in the transverse direction (Y). A second guide rail, which extends parallel to the first guide rail, is spaced apart from the first guide rail in the height direction (Z) and which has a second carriage guide, which extends in the longitudinal direction (X) along the second guide rail and varies in the transverse direction (Y). A pusher element for coupling with the wind deflector, includes a first guide element which can be adjusted in a guided manner in the first carriage guide and a second guide element which can be adjusted in a guided manner in the second carriage guide.

10 Claims, 1 Drawing Sheet

(56) References Cited

U.S. PATENT DOCUMENTS 10,829,158 B2 11/2020 Shen et al.

FOREIGN PATENT DOCUMENTS

| | | | |
|---|---|---|---|
| DE | 102019114702 | A1 | 1/2020 |
| DE | 102017004964 | B4 | 4/2021 |
| DE | 102019215725 | A1 | 4/2021 |
| FR | 2854860 | B1 | 6/2006 |

* cited by examiner

PROPULSION DEVICE, WIND DEFLECTOR AND MOTOR VEHICLE

CROSS-REFERENCE TO RELATED APPLICATION

This application claims priority to German Patent Application No. 10 2023 117 947.0, filed Jul. 7, 2023, the content of such application being incorporated by reference herein in its entirety.

FIELD OF THE INVENTION

The present invention relates to a propulsion device for retracting and extending a wind deflector of a motor vehicle. The invention also relates to a wind deflector for a motor vehicle equipped with such a propulsion device. The invention further relates to a motor vehicle equipped with such a wind deflector.

BACKGROUND OF THE INVENTION

A wind deflector is known from DE 10 2017 004 964B4, which is incorporated by reference herein, which can be adjusted on a body of a motor vehicle using a propulsion device between a retracted passive position and an extended active position. The propulsion device of the known wind deflector comprises an actuator that drives two drive rods in parallel via a transmission, each of which has two levers attached, which are fixedly connected to an air guiding element of the wind deflector.

A lateral wind deflector is known from DE 10 2019 114 702A1, which is incorporated by reference herein, which is integrated into a D-pillar of a motor vehicle. The associated propulsion device operates with a worm gear.

A motor vehicle is known from US 10 829 158B2 which is incorporated by reference herein, in which a door sill can be adjusted between a vertically oriented passive position, which the door sill occupies when the vehicle is turned off, as well as during travel operations, and a horizontally active position, which the door sill occupies when the vehicle side door is open, for example, to facilitate boarding and disembarking. An associated actuator operates with gas pressure cylinders. This vehicle is also equipped with a front bumper unit that can be adjusted in the height direction relative to the body. An associated propulsion device operates with a cable drive configured as an open cable pull, in which a first end of a cable is connected to the front bumper unit, while a second end of the cable is connected to a cable winch for raising and lowering the front bumper unit.

A motor vehicle is known from FR 28 54 860B1, which is incorporated by reference herein, which has a plurality of wind deflectors, which are arranged in a rear area of the vehicle and can be pivoted between an active position and a passive position about a pivot axis oriented in the vehicle longitudinal direction.

SUMMARY OF THE INVENTION

Described herein is a propulsion device, or for a wind deflector equipped therewith, or for a motor vehicle equipped therewith, which is characterized in particular by a high level of functional safety. At the same time, a space-saving and/or cost-effective viable design is strived for.

The invention relates to the general idea of adjusting a pusher element configured for coupling with the wind deflector via a slotted guide along guide rails and using a cable drive to drive the pusher element. A slotted guide is characterized by high reliability, requires comparatively little design space and is also relatively inexpensive to realize. Cable drives also operate reliably. Furthermore, a cable drive can also be configured comparatively small so that it requires relatively little design space. In addition, a cable drive can also be realized comparatively inexpensively.

Specifically, the invention proposes to equip the propulsion device having a longitudinal direction, a transverse direction extending perpendicular to the longitudinal direction, and a height direction extending perpendicular to the transverse direction with a first guide rail, which extends in the longitudinal direction and having a first carriage guide, which extends in the longitudinal direction along the first guide rail and varying in the transverse direction. The propulsion device is also provided with a second guide rail, which extends parallel to the first guide rail, i.e., parallel to the longitudinal direction, which is spaced apart from the first guide rail in the height direction, and which has a second carriage guide, which extends in the longitudinal direction along the second guide rail and varies in the transverse direction. The propulsion device is also equipped with a pusher element for coupling with the wind deflector comprising a first guide element which can be adjusted in a guided manner in the first carriage guide and a second guide element which can be adjusted in a guided manner in the second carriage guide. Further, the propulsion device is equipped with a cable drive for driving the pusher element relative to the guide rails, such that the pusher element moves in the longitudinal direction along the guide rails. The cable drive has a cable fixedly connected to the pusher element as well as a motor for driving the cable. During operation of the propulsion device, the motor drives the cable, which in turn drives the pusher element, such that the pusher element moves in the longitudinal direction along the two guide rails. Here, the two guide elements of the pusher element are guided in the two carriage guides, such that the guide elements follow the contour of the respective carriage guides. As the carriage guides vary along the longitudinal direction in the transverse direction, the displacement of the guide elements in the longitudinal direction necessarily results in the displacement of the guide elements in the transverse direction. This also adjusts the pusher element in the transverse direction, which can be used to move, i.e., to retract and extend, the respective wind deflector.

The two carriage guides may be configured to vary identically or differently in the transverse direction. At least one of the carriage guides may be configured to be constant in the direction of the height, i.e., not to vary.

According to an advantageous embodiment, the cable drive can be configured as a closed cable pull, in which the cable rotates in a closed manner, i.e., it is virtually endless. A closed cable pull is characterized by a particularly high functional reliability, as drive forces can be introduced into the cable in both directions via the cable, i.e., pull forces and push forces. In contrast to an open cable pull in which the drive is arranged at one end of the cable, a secure transmission of force can only be realized in one direction, namely in the pull direction.

According to another advantageous embodiment, the cable drive may comprise a first deflection roller arranged in the area of a first longitudinal end of the guide rails and, in particular, rotatable about a first rotation axis parallel to the transverse direction and a second deflection roller arranged in the area of a second longitudinal end of the guide rails and, in particular, rotatable about a second rotation axis parallel to the transverse direction. The cable may now wrap around the first deflection roller and the second deflection roller each by less than 360°. The first deflection roller and the second deflection roller may be suitably arranged, such that the cable has a first cable section extending parallel to the longitudinal direction and leading from the first deflection roller to the second deflection roller, to which the pusher element is attached. This allows the driver element to be moved back and forth between the two deflection rollers.

According to an advantageous embodiment, the cable drive may comprise a drive roller driven rotationally by the motor, which can in particular be rotated about an axis of rotation that is parallel to the transverse direction. The cable may now wrap around the drive roller by at least 360°. The drive roller driven rotationally by the motor takes the cable, whereby the cable is moved around the drive roller and around the deflection rollers, and correspondingly takes the pusher element along the first cable section.

If the axes of rotation are aligned parallel to the transverse direction and/or the axis of rotation is aligned parallel to the transverse direction, the propulsion device is extremely compact in the transverse direction.

According to an advantageous embodiment, the cable drive may comprise a cable tensioning element arranged in the cable. The cable tensioning element serves to maintain a minimum tension in the cable of the closed cable pull. The cable tensioning element may compensate for changes in the length of the cable within the closed cable pull that are caused by thermal factors. Likewise, the cable tensioning element may compensate for changes in the length of the cable, for example, due to the pusher element being simultaneously adjusted in the longitudinal direction during adjustment. The cable tensioning element can thereby connect two ends of the cable to each other, thereby closing the cable in the cable pull and rotating virtually endlessly. In the cable tensioning element, the two cable ends may be pretensioned towards each other by means of a spring device.

In another advantageous embodiment, the drive roller may be arranged in the area of the first longitudinal end of the guide rails and in the area of the first deflection roller, such that the cable has a second cable section leading from the drive roller to the second deflection roller, which extends along a connecting straight line which is tangent to the first deflection roller and the second deflection roller on a side facing away from the first cable section. In this embodiment, the cable drive is comparatively compact in the height direction. Such a cable tensioning element can now be suitably arranged on the first cable section. The cable tensioning element limits the longitudinal stroke that can be realized using the pusher element, as the cable tensioning element cannot be moved via the deflection rollers or even via the drive roller. Accordingly, the cable tensioning element attached to the first cable section can only be moved between the first deflection roller and the second deflection roller.

According to an advantageous embodiment, the two deflection rollers may have equal diameters, such that the connecting straight line and the second cable section extend parallel to the longitudinal direction. In this case, a connecting axis, which is perpendicular to the two axes of rotation parallel to the transverse direction, also extends parallel to the longitudinal direction. The drive roller is suitably located on a side of the second cable section facing away from the first cable section, such that the drive roller rotates in the opposite direction to the deflection rollers when the cable moves.

In an alternative design, the drive roller may be spaced apart from the first deflection roller in the height direction and arranged in the area of the first longitudinal end of the guide rails, such that the cable has a second cable section leading from the drive roller to the second deflection roller that is inclined in the longitudinal direction and inclined in the height direction. In this case, the drive roller may be located on a side of the second cable section facing the first cable section, such that the drive roller rotates in the same direction as the deflection rollers when the cable moves. The cable then runs along a triangle whose corners are formed by the two deflection rollers and the drive roller. The second cable section is larger than the first cable section. An embodiment in which such a cable tensioning element is arranged on the second cable section is particularly suitable. As the second cable section is larger than the first cable section in this configuration, a larger longitudinal stroke may be realized for the pusher element in this configuration.

According to another advantageous embodiment, the first deflection roller and the second deflection roller may be arranged on the first guide rail. In particular, this allows the drive coupling between the cable and the pusher element to be carried out in the area of the first guide element, in particular on the first guide element, so that the drive forces are transferred virtually parallel to the longitudinal direction, so that tilting moments on the pusher element are reduced or avoided. At the same time, this relieves the guide rails and the guide element of forces acting in the height direction and the transverse directions.

Additionally or alternatively, the first guide element may be guided in the first carriage guide in the transverse direction and in the height direction along the longitudinal direction. In other words, the first guide element or the first carriage guide assumes the guidance of the pusher element via the first guide element in the height direction and in the transverse direction during displacement in the longitudinal direction. The transverse direction varies, while the height direction may be constant or invariant or also variable. Additionally or alternatively, it may also be provided that the second guide element is guided in the second carriage guide in the height direction and in the transverse direction along the longitudinal direction. In other words, the second guide element is guided in the second carriage guide only in the transverse direction, while it has sufficient play of movement in the height direction, for example to be able to compensate for thermal expansion effects. Decoupling the second guide element within the second carriage guide with respect to the height direction ensures a high level of reliability of the cable drive, as in particular a possible tilting of the pusher element does not result in any jamming in the height direction between the two carriage guides.

A wind deflector according to the present invention for a motor vehicle is equipped with a flat air guiding element which can be adjusted relative to a body of the vehicle between a retracted passive position, in which the air guiding element is integrated into an outer contour of the body, and an extended active position, in which the air guiding element projects from the outer contour of the body. The wind deflector according to aspects of the invention is also equipped with a propulsion device of the type described above, whose guide rails can be fixedly attached to the body and whose pusher element is attached to the air guiding element.

A motor vehicle according to aspects of the invention, which can in particular be a passenger vehicle, comprises a body as well as at least one wind deflector of the type described above, wherein the guide rails of the respective propulsion device are fixedly attached to the body. The respective wind deflector may be configured as a lateral wind deflector so that it projects from the body in the active position relative to a vehicle transverse direction. The propulsion device is then attached to the body, such that its transverse direction extends substantially parallel to the vehicle transverse direction.

Further important features and advantages of the invention will emerge from the dependent claims, from the drawings and from the associated description of the figures with reference to the drawings.

It should be understood that the features specified above and those described below can be used not only in the respectively specified combination, but also in other combinations or on their own, without departing from the scope of the invention as defined by the claims. The components described above and referred to below of a higher-level unit, e.g., a device, an apparatus, or an assembly, which are indicated separately, can constitute separate parts and/or components of this unit, or integral areas and/or sections of this unit, even if the drawings show otherwise.

Preferred embodiment examples of the invention are represented in the drawings and are explained in further detail in the description below, wherein identical reference numbers refer to identical, similar, or functionally identical components.

BRIEF DESCRIPTION OF THE DRAWINGS

The drawings show, in each case schematically.

DETAILED DESCRIPTION OF THE INVENTION

Figure 1:
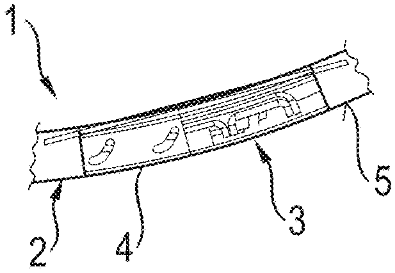
FIG. 1 is a sectional view of a vehicle in the area of a wind deflector in a passive position.
Figure 2:
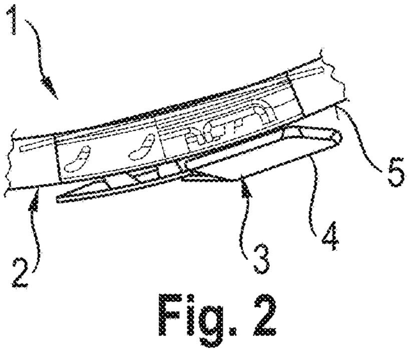
FIG. 2 is a view as in FIG. 1, but with the wind deflector in an active position.

According to FIGS. 1 and 2, a motor vehicle 1 shown only in part here comprises a body 2 on which at least one wind deflector 3 is arranged. The wind deflector 3 has a flat air guiding element 4, which can be adjusted relative to the body 2 between a retracted passive position shown in FIG. 1 and an extended active position shown in FIG. 2. In the passive position according to FIG. 1, the air guiding element 4 is integrated into an outer contour 5 of the body 2, such that the air guiding element 4 does not form an interference contour on the outer contour 5. In particular, the air guiding element 4 can be recessed into the body 2 in the passive position and thus be flush with it. In the active position according to FIG. 2, the air guiding element 4 projects from the outer contour 5 of the body 2 and, during operation of the vehicle 1, interacts with an air flow flowing around the vehicle 1 along the outer contour 5 in order to guide it in a suitable manner. In particular, the wind deflector 3 may be configured as a lateral wind deflector 3 which, in the active position, projects from the outer contour 5 in a vehicle transverse direction. Such a lateral wind deflector 3 can in particular be arranged on one side of the vehicle, for example in order to improve the flow of the vehicle 1 around the mudguards. Such a lateral wind deflector may also be arranged, for example, in the area of a C-pillar and/or at the rear of the vehicle, in order to improve the air flow around the vehicle and/or to improve the lateral stability of the vehicle 1.

Figure 3:
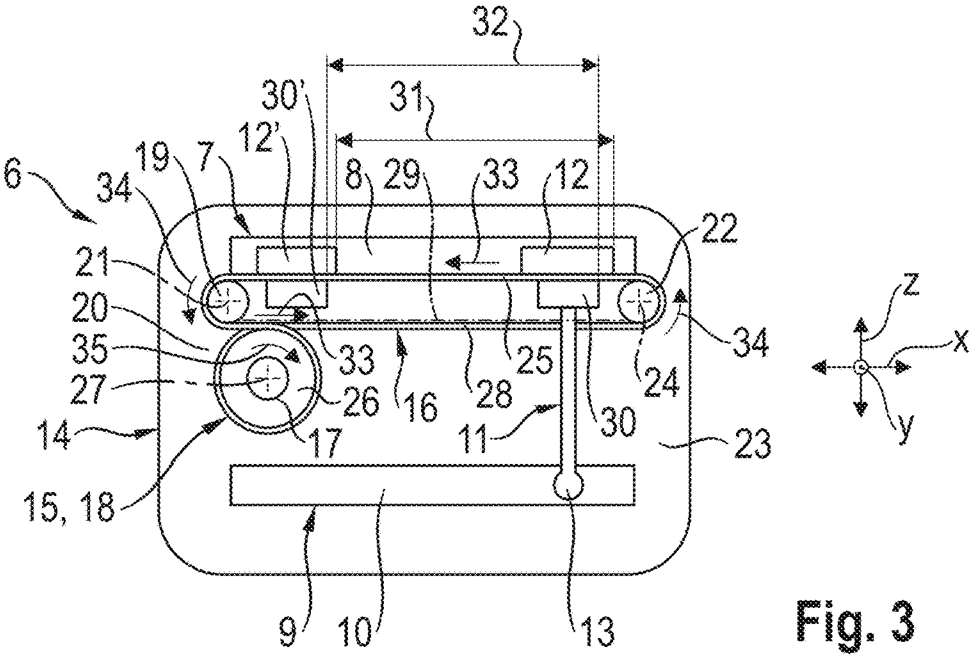
FIG. 3 is a highly simplified schematic of a propulsion device for driving the wind deflector in a first embodiment.
Figure 4:
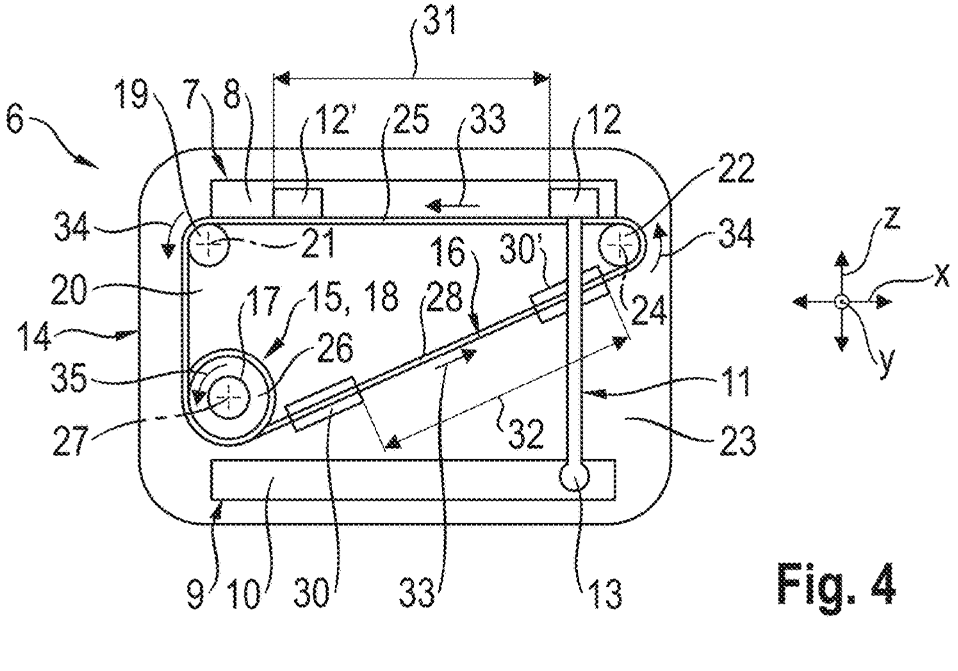
FIG. 4 is a view as in FIG. 3, but in a second embodiment of the propulsion device.

The wind deflector 3 is equipped with a propulsion device 6 shown in FIGS. 3 and 4, which is configured to retract and extend the wind deflector 3 relative to the body 2. According to FIGS. 3 and 4, such a propulsion device 6 has a longitudinal direction X, a transverse direction Y and a height direction Z that extend perpendicular to each other. In the illustrations of FIGS. 3 and 4, the longitudinal direction X extends horizontally while the height direction Z extends vertically. The transverse direction Y is perpendicular to the drawing plane.

The propulsion device 6 comprises a first guide rail 7, which extends in the longitudinal direction X and has a first carriage guide 8, which extends in the longitudinal direction X along the first guide rail 7 and varies in the transverse direction Y. In the example shown, the first carriage guide 8 is constant or invariant in the height direction Z. The propulsion device 6 also comprises a second guide rail 9, which extends parallel to the first guide rail 7, i.e., also parallel to the longitudinal direction X, and which is spaced apart from the first guide rail 7 in the height direction Z. The second guide rail 9 comprises a second carriage guide 10, which extends in the longitudinal direction X along the second guide rail 9 and varies in the transverse direction Y. The propulsion device 6 further comprises a pusher element 11, which is provided for coupling with the wind deflector 3. In the assembled state, the pusher element 11 is drive-connected to the air guiding element 4. The pusher element 11 comprises a first guide element 12, which can be adjusted in a guided manner in the first carriage guide 8, and a second guide element 13, which can be adjusted in a guided manner in the second carriage guide 10. In the examples of FIGS. 3 and 4, the guide rails 7, 9 are respectively attached to a carrier plate 14 with the help of which the entire propulsion device 6 can be attached to the body 2.

The propulsion device 6 is also equipped with a cable drive 15, which is configured to drive the pusher element 11 relative to the guide rails 7, 9, such that the driven pusher element 11 moves in the longitudinal direction X along the guide rails 7, 9. The cable drive 15 has a cable 16 fixedly connected to the pusher element 11 and a motor 17 for driving the cable 16. In the embodiments shown here, the cable drive 15 is configured as a closed cable pull 18, which is characterized by the cable 16 rotating in a closed manner, i.e., it is virtually endless.

The cable drive 15 comprises a first deflection roller 19, which is arranged in the area of a first longitudinal end 20 of the guide rails 7, 9 on the carrier plate 14. The first deflector roller 19 is rotatably mounted on the carrier plate 14 around a first axis of rotation 21 extending parallel to the transverse direction Y. The cable drive 15 also comprises a second deflection roller 22, which is arranged in the area of a second longitudinal end 23 of the guide rails 7, 9 on the carrier plate 14. The second deflector roller 22 is suitably rotatably mounted on the carrier plate 14 around a second axis of rotation 24 extending parallel to the transverse direction Y. The cable 16 wraps around the first deflection roller 19 and the second deflection roller 22 each by less than 360°. In the example of FIG. 3, the cable 16 wraps around both deflection rollers 19, 22 each by about 180°. In the example of FIG. 4, the cable 16 wraps around the first deflection 19 by about 90° while wrapping around the second deflection 23 by 150°. The first deflection roller 19 and the second deflection roller 22 are arranged, such that the cable 16 has a first cable section 25 extending parallel to the longitudinal direction X and leading from the first deflection roller 19 to the second deflection roller 22. The pusher element 11 is attached to this first cable section 25. In the embodiments shown herein, the first cable section 25 is attached to the first guide element 12. In this way, the transmission of force between the cable 16 and the pusher element 11 occurs with respect to the first guide rail 7 virtually free of torques about axes extending parallel to the transverse direction Y.

The cable drive 15 also has a drive roller 26 that is rotationally driven by the motor 17. The drive roller 26 rotates about an axis of rotation 27, which also preferably extends parallel to the transverse direction Y. The cable 16 wraps around the drive roller 26 by at least 360°. In the example of FIG. 3, the cable 16 wraps around the drive roller by about 360°. In the example of FIG. 4, the cable 16 wraps around the drive roller by about 480°.

In the first embodiment shown in FIG. 3, the drive roller 26 is arranged in the area of the first longitudinal end 20 of the guide rails 7, 9 and in the area of the first deflection roller 19 on the carrier plate 14, such that the cable 16 has a second cable section 28 leading from the drive roller 26 to the second deflection roller 22 and which extends along a connecting straight line 29 which is tangent to the first deflection roller 19 and the second deflection roller 22 on a side facing away from the first cable section 25, i.e., it touches them. In the embodiments shown herein, the two deflection rollers 19, 22 have equal diameters, such that the connecting straight line 29 extends parallel to the longitudinal direction X. Subsequently, the second cable section 28 in the example of FIG. 3 also extends parallel to the longitudinal direction X.

In the second embodiment shown in FIG. 4, in contrast, the drive roller 26 is spaced apart from the first deflection roller 19 in the height direction Z and is arranged on the carrier plate 14 in the area of the first longitudinal end 20 of the guide rails 7, 9 such that the cable 16 again has a second cable section 28 leading from the drive roller 26 to the second deflection roller 22. In the second embodiment, however, this second cable section 28 is inclined with respect to the longitudinal direction X and with respect to the height direction Z.

Regardless of the two embodiments shown herein, the cable drive 15 is also suitably equipped with a cable tensioning element 30, which is attached to the cable 16 and which serves to keep the cable 16 under a predetermined minimum tension. For example, the two ends of the cable 16 can be held in the cable tensioning element 30 and pretensioned towards each other by means of a spring element.

In the first embodiment shown in FIG. 3, the cable tensioning element 30 is arranged on the first cable section 25. In contrast, in the second embodiment shown in FIG. 4, the cable tensioning element 30 is arranged on the second cable section 28. As the cable tensioning element 30 cannot rotate around the deflection rollers 19, 22 or the drive roller 26, the cable tensioning element 30 defines a maximum longitudinal stroke 31, i.e., the maximum possible adjustment distance for the pusher element 11 or for the first guide element 12. To illustrate the longitudinal stroke 31, the first guide element 12 in FIGS. 3 and 4 is also shown in a second end position and designated with 12'.

In the first embodiment according to FIG. 3, a maximum adjustment distance 32 of the cable tensioning element 30 is limited by the first deflection roller 19 and the second deflection roller 22. As the pusher element 11 and the cable tensioning element 30 are attached to the first cable section 25, the maximum longitudinal stroke 30 of the pusher element 11 or the first guide element 12 is the same as the maximum adjustment distance 32 of the cable tensioning element 30. By way of illustration, in FIGS. 3 and 4, the cable tensioning element 30 is also shown in a second end position and designated with 30'.

In the embodiment shown in FIG. 4, the cable tensioning element 30 is now attached to the second cable section 28, such that its maximum adjustment distance 32 is determined by the distance between the drive roller 26 below the second deflection roller 22. Due to the slope between the second cable section 28 and the first cable section 25, the maximum longitudinal stroke 31 of the pusher element 11 or the first guide element 12 are correspondingly smaller than the adjustment distance 32. As in this second embodiment, the drive roller 26 has a greater distance from the second deflection roller 22 in the longitudinal direction X than in the first embodiment shown in FIG. 3, the second longitudinal section 28 is significantly larger in the second embodiment than in the first embodiment, such that in the second embodiment shown in FIG. 4, a larger longitudinal stroke 31 can be realized overall for the pusher element 11 than in the first embodiment shown in FIG. 3.

In both embodiments, the two deflection rollers 19, 22 are arranged on the first guide rail 7, such that the transmission of force described above, which is largely torque-free, can be realized between the cable 16 and the first guide element 12.

In the examples of FIGS. 3 and 4, when the pusher element 11 is adjusted, the cable 16 moves from the initial position shown in FIGS. 3 and 4, which corresponds, for example, to the passive position of the wind deflector 3 or the air guiding element 4, to an end position, which then corresponds to the active position of the wind deflector 3 or the air guiding element 4. This end position is indicated by the longitudinal stroke 31 and the correspondingly adjusted first guide element 12'. This results in a direction of movement 33 indicated by arrows in the cable 16 and a direction of rotation 34 indicated by arrows in the two deflection rollers 19, 22, which is oriented in the counter-clockwise direction in FIGS. 3 and 4. In the first embodiment shown in FIG. 3, the drive roller 26 is located on a side of the second cable section 28 facing away from the first cable section 25. This allows the cable 16 to be wrapped around the drive roller 26, such that a direction of rotation 35 is set for the direction of movement 33 of the cable 16, which is opposite to the direction of rotation 34 of the two deflection rollers 19, 22. In the first embodiment shown in FIG. 3, the direction of rotation 35 of the drive roller 36 is oriented in a clockwise direction. In the second embodiment shown in FIG. 4, the drive roller 26 is arranged on a side of the second cable section 28 facing the first cable section 25, such that wrapping the cable 16 around the drive roller 26 can be selected such that the drive roller 26 rotates in the same direction as the deflection rollers 19, 22. In FIG. 4, the direction of rotation 35 of the drive roller 26 is therefore also oriented in a counter-clockwise direction.

It is indicated in FIGS. 3 and 4 that the first guide element 12 is guided in the first carriage guide 8 in the transverse direction Y and in the height direction Z along the longitudinal direction X. In contrast, the second guide element 13 can be moved in the second carriage guide 10 in the height direction Z and guided along the longitudinal direction X only in the transverse direction Y. As a result, the pusher element 11 can tilt about a tilt axis extending parallel to the transverse direction Y without the pusher element 11 becoming jammed in the two carriage guides 8, 10.

What is claimed is:

1. A propulsion device for retracting and extending a wind deflector of a vehicle, said propulsion device comprising:

a first guide rail extending in a longitudinal direction (X);

a first carriage guide, which extends in the longitudinal direction (X) along the first guide rail and varies in a transverse direction (Y) that is perpendicular to the longitudinal direction (X);

a second guide rail, which extends parallel to the first guide rail, and is spaced apart from the first guide rail in a height direction (Z) that is perpendicular to the longitudinal direction (X) and the transverse direction (Y);

a second carriage guide, which extends in the longitudinal direction (X) along the second guide rail and varies in the transverse direction (Y);

a pusher element for coupling with the wind deflector, said pusher element comprising a first guide element, which is configured to be adjusted in a guided manner in the first carriage guide, and a second guide element which is configured to be adjusted in a guided manner in the second carriage guide; and a cable drive for driving the pusher element relative to the guide rails, such that the pusher element moves in the longitudinal direction (X) along the guide rails, wherein the cable drive has a cable fixedly connected to the pusher element and a motor for driving the cable.

2. The propulsion device according to claim 1, wherein the cable drive is configured as a closed cable pull in which the cable rotates in a closed manner.

3. The propulsion device according to claim 1, wherein the cable drive comprises a first deflection roller, which is arranged in an area of a first longitudinal end of the guide rails, and a second deflection roller, which is arranged in an area of a second longitudinal end of the guide rails, wherein the cable wraps around the first deflection roller and the second deflection roller by less than 360°, and wherein the first deflection roller and the second deflection roller are arranged such that the cable has a first cable section extending parallel to the longitudinal direction (X) and leading from the first deflection roller to the second deflection roller, to which the pusher element is attached.

4. The propulsion device according to claim 3, wherein the cable drive comprises a drive roller driven rotationally by the motor, and wherein the cable wraps around the drive roller by at least 360°.

5. The propulsion device according to claim 4, wherein the drive roller is arranged in the area of the first longitudinal end of the guide rails and in the area of the first deflection roller, such that the cable has a second cable section leading from the drive roller to the second deflection roller, which extends along a connecting straight line which is tangent to the first deflection roller and the second deflection roller on a side facing away from the first cable section, wherein a cable tensioning element is arranged on the first cable section.

6. The propulsion device according to claim 5, wherein the two deflection rollers have a same diameter, such that the connecting straight line and the second cable section extend parallel to the longitudinal direction (X).

7. The propulsion device according to claim 4, wherein the drive roller is spaced apart from the first deflection roller in the height direction (Z) and is arranged in the area of the first longitudinal end of the guide rails, such that the cable has a second cable section leading from the drive roller to the second deflection roller, which extends inclined to the longitudinal direction (X) and inclined to the height direction (Z), wherein a cable tensioning element is arranged on the second cable section.

8. The propulsion device according to claim 3, wherein (i) the first deflection roller and the second deflection roller are arranged on the first guide rail, and/or (ii) the first guide element is guided in the first carriage guide in the transverse direction (Y) and in the height direction (Z) along the longitudinal direction (X), and/or (iii) the second guide element is configured to be moved in the second carriage guide in the height direction (Z) and is guided in the transverse direction (Y) along the longitudinal direction (X).

9. A wind deflector for a motor vehicle, said wind deflector comprising:

a flat air guiding element which is configured to be adjusted relative to a body of the motor vehicle between a retracted passive position, in which the air guiding element is integrated into an outer contour of the body, and an extended active position, in which the air guiding element projects from the outer contour of the body; and the propulsion device according to claim 1, wherein the first and second guide rails are configured to be fixedly attached to the body and the pusher element is attached to the air guiding element.

10. A motor vehicle comprising a body and the wind deflector according to claim 9, wherein the guide rails are fixedly attached to the body.

* * * * *